Dec. 13, 1932. W. L. WRIGHT 1,890,764
METHOD OF PRODUCING MOTION PICTURES
Filed Nov. 5, 1928
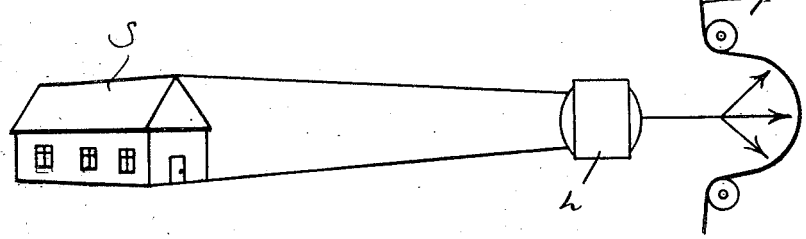
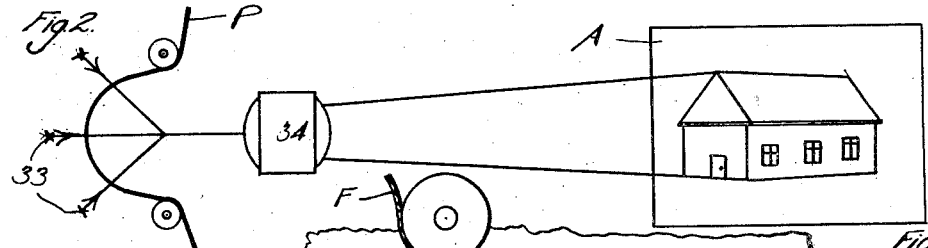
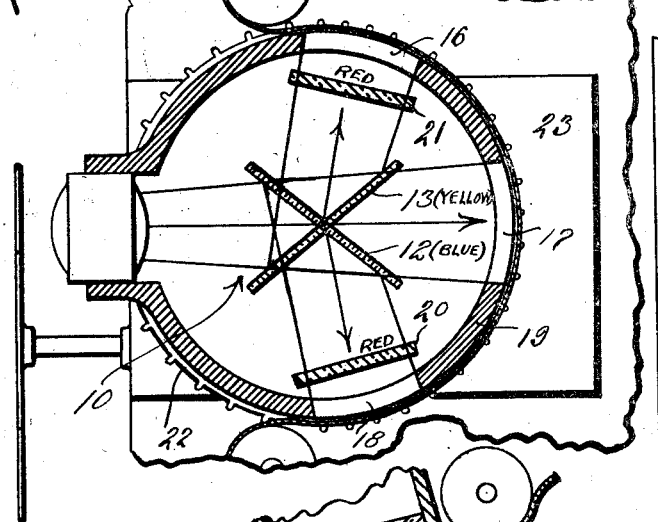
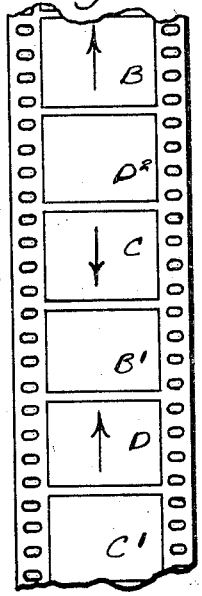
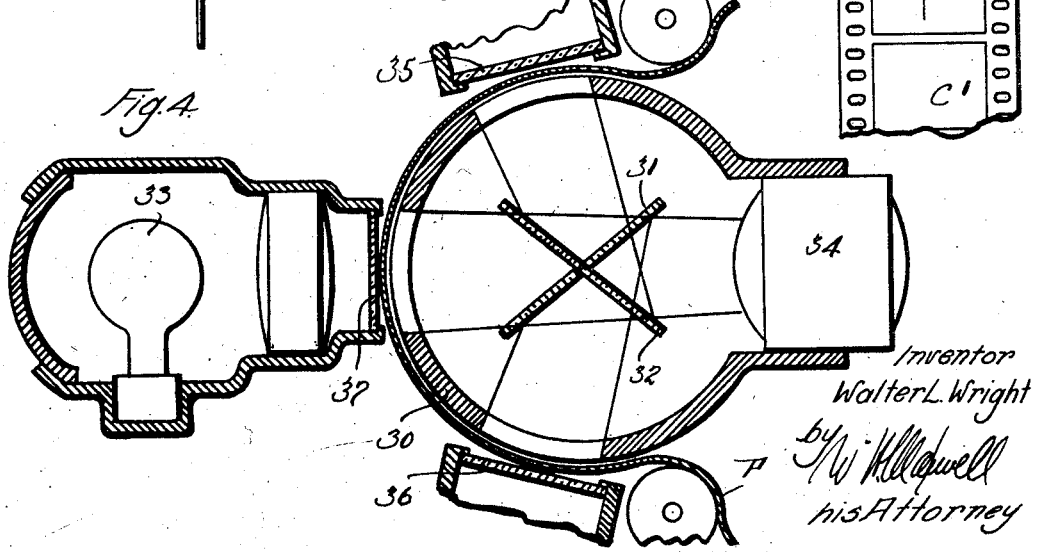
Inventor
Walter L. Wright
by his Attorney

UNITED STATES PATENT OFFICE

WALTER L. WRIGHT, OF SANTA MONICA, CALIFORNIA, ASSIGNOR TO SYNCHROME CORPORATION, OF LOS ANGELES COUNTY, CALIFORNIA, A CORPORATION OF CALIFORNIA

METHOD OF PRODUCING MOTION PICTURES

Application filed November 5, 1928. Serial No. 317,385.

This invention has to do with a method of producing motion pictures and it is a general object of the invention to provide a method particularly suited for color motion pictures.

It is a general object of my present invention to provide a method which facilitates the practical and economical production of motion pictures in natural color, the invention being concerned with the handling of light and film in a manner totally different from that employed in the ordinary methods of motion picture work.

A further object of the invention is to provide a method which facilitates the simultaneous exposure of a plurality of picture areas spaced apart on a single strip of film through a single lens of comparatively short focal length and the projection of pictures thus obtained onto a screen simultaneously and in perfect register.

The present invention is concerned primarily with the production of motion pictures in natural color and it is believed that the nature of the invention will be best and more fully understood from a detailed description of a typical manner of carrying out the invention to produce motion pictures in natural color, and therefore I will proceed with such detailed description, throughout which description I will make reference to the accompanying drawing, in which:

Fig. 1 is a diagrammatic view illustrating the exposure of the film. Fig. 2 is a diagrammatic view illustrating the projection of the positive film. Fig. 3 is an enlarged detailed view illustrating in detail the operations of dividing the light from the subject and directing it onto spaced areas of the film. Fig. 4 is an enlarged detailed view illustrating the projection of light through the several pictures of the film and into a single shaft to fall on a screen, and Fig. 5 is a view illustrating a length of film such as may be produced in the course of carrying out the present method.

The present invention provides, generally, the passing of light from a subject S through a single lens L, the division of the light passed by the lens into a plurality of shafts which are chromatically different, or which carry different chromatic values of the subject, the curving of a strip negative film F in the paths of the said several chromatically different shafts of light to expose spaced areas of the film, cutting off of the light from the subject and the advancement of the film and thereafter continuously repeating the above described action, the production of a positive film P from the negative so that the positive carries spaced records or pictures which are of the different chromatic values of the subject, the projection of light through the positive film P while the film is in curved position corresponding to that in which the film F was held during exposure, the introduction of color values in the projected shafts of light corresponding to the records on the film P, and the direction of the shafts of light passing through the film P onto a screen A in register to form an image of the subject S in natural color, the cutting off of the projected light from the screen and advancing the film and then continuously repeating the projecting operation.

It is a significant feature of the invention that the film is curved where the exposures are made on it, and it is a further feature of the invention that the film is likewise curved at the pictures being projected during projection. These features clearly distinguish this invention over prior processes in that the prior art teaches, generally, the taking of the pictures on flat areas or on the film in a flat position and the projection through flat areas or through the film held in flat position.

Referring to the specific carrying out of the invention, light from the object or subject S enters the usual or standard type of lens device L and the shaft of light passed by the lens device is divided or separated by light dividing means 10 into a plurality of separate shafts of different chromatic values of the subject. In carrying out the invention the lens device L may be within the range or limits practical for commercial motion picture photography, that is the diameter and focal length of the lens may be within such limits. As a means 10 for dividing the shaft of light passed by the lens to separate the chromatic values into different or separate shafts I have shown a pair of crossed transparent light dividers 12 and 13 arranged in the path of light from the lens with their point of crossing substantially coincident with the axis of the lens. The desired chromatic separation may be obtained by making the reflectors of different primary colors and by providing color filters 20 and 21 in the path of the light reflected by the dividers 12 and 13, respectively, the filters being of other primary colors. For purpose of example, I will refer to the divider 12 as being a blue filter, the divider 13 a yellow filter, and the filters 20 and 21 as red. In this case the light passed from the lens reflected by the front face of the divider 13 is influenced by blue of divider 12 and then by the red of filter 21, the blue and red influence causing the light passed by the divider 13 and filter 20 to be predominantly violet. Light reflected by the back surface of the divider 13 and reaching the filter is cut out by the complementary action of the red filter. The light reflected by the front face of divider 12 is influenced by the yellow of divider 13 and the red of filter 20, so that the light reflected by the divider 12 and passed by the filter 20 is predominantly orange. Light reflected by the back surface of divider 12 is cut out by the complementary action of filter 20. The light passing both dividers is influenced by both blue and yellow and is therefore predominantly green. Legends have been applied to Fig. 3 of the drawing to facilitate an understanding of the color combination just described.

From the foregoing description and from consideration of the illustration on Fig. 3 it will be apparent that the three separate shafts of light resulting from the action of the light dividing means 10 are of different chromatic values of the subject S and extend or project radially from a common or central point in the axis of the lens spaced somewhat behind the lens. The film F is handled by a guide 19 so that it is curved about the said central point from which the chromatically different shafts of light radiate and is in position to be exposed by these shafts of light. In the particular case illustrated the guide 19 is within the said curved part of the film F in which case apertures 16, 17 and 18 are provided in the guide 19. With this arrangement, the several points of the film receiving the exposures are held curved concentrically about the common center from which the chromatically different shafts of light radiate and therefore are equal distances from the lens L so that they are all the same focal distance from the lens.

A film advancing sprocket 22 may be intermittently operated by a suitable movement mechanism 23 and a shutter for cutting off the light from the subject may be operated in synchronism with the film moving sprocket. In accordance with the well-known action, the shutter cuts off the light between the subject and the film while the film is being advanced and made ready for exposure. The light dividing means 10 and film guide means 19 above described may be proportioned and related so that the several picture areas of the film formed by each exposure are spaced apart distances corresponding to a picture area and the film actuating sprocket 22 may be advanced in multiples of such distance, for instance three times such distance, in a manner to cause the various series of exposures or pictures to mesh or lap together so that the spaces between the pictures of each series are occupied by pictures of adjoining series. This relationing is illustrated in Fig. 5 where the letters B, C and D designate picture areas exposed during a single exposure, while letters B1 and C1 designate two of the pictures taken during the preceding exposure, and the letter D2 designates one of the pictures taken upon the succeeding exposure.

The film F after having been exposed as above described may be developed and handled in accordance with standard methods to develop the images. For purpose of reference, the film F will be considered a negative film. This negative film F after development is used to make a positive print film P to be used during projection. It is to be understood, of course, that the invention is not concerned with the details involved following the exposure of the film F and until the film P is reached for projection, it being obvious that reversal processes are known whereby the film F and film P may be the same film whereas with standard commercial methods the film F is a negative while the film P is merely a positive print taken from the negative.

The film P carrying the pictures obtained as above described may be projected through a mechanical arrangement very similar to that above described. For purpose of example I have illustrated a circular film guide 30 supporting a suitable length of the film P about a common axis and I have provided crossed chromatic transparent plates 31 and 32 within the curved part of the film with their point of intersection coinciding with the said axis or point about which the film is curved. Suitable sources of illumination 33 are provided to simultaneously project shafts of light through a series of picture areas of the film P in a manner to fall upon and pass through the plates 31 and 32 to form a single shaft of light which can be projected through a lens 34 onto the screen A. In order to obtain the desired color values in the image projected on the screen A, color values are introduced in the shafts of light passed by the several picture areas of the film. For purpose of example, the filter 32 will be referred to as yellow in which case the light to be reflected from its front surface and which is projected through the picture of the violet subject of the object is colored violet as by a filter 35. The filter 31 is blue and the light to be reflected by the front surface of the filter 31 and passing the picture of the orange values of the subject is colored orange as by a filter 36, while the light to pass through both filters and through the picture of the green values of the subject is colored green as by a filter 37. The filtering action of the plates 31 and 32 to prevent secondary reflections will be obvious from the detailed description given with reference to the crossed light dividers used in obtaining the exposure of film F. The several chromatically different shafts of light pass through the lens device 34 with their axes coincident and therefore fall upon the screen A in perfect register, and because of their different chromatic values they form an image in natural color.

From the foregoing description of the method and of typical apparatus to be used in carrying out the method, it will be apparent that my invention utilizes equipment which is extremely simple and inexpensive and that it facilitates the use of standard forms of film, lens devices within standard limits, and permits of economical use of film and a practical handling of color. All of these factors unite to the end that the invention provides for the economical and practical production of motion pictures in natural color.

Certain of the units of the apparatus, features of process, and mechanical constructions set forth or referred to in the foregoing descriptions are set forth and claimed in the following co-pending applications: Motion picture film, filed November 5, 1928, Serial No. 317,386; Motion picture projector, filed September 3, 1929, Serial No. 390,121; Construction for cameras, projectors, etc., filed Sept. 25, 1928, Serial No. 308,241; Optical system, filed Nov. 15, 1927, Serial No. 233,375.

Having described only typical preferred forms and applications of the invention, I do not wish to limit myself to the specific details set forth, but wish to reserve to myself any changes or variations that may appear to those skilled in the art or fall within the scope of the following claims:

Having described my invention, I claim:

1. The cinematographic process including, holding a portion of a length of film curved about a center, receiving a shaft of light from a subject and dividing it into a plurality of shafts to pass radially to the curved portion of the film to make a plurality of photographic exposures in longitudinal alignment simultaneously on the film and spaced apart longitudinally of the film at distances substantially equal to their lengths, and intermittently advancing the film distances that are approximately multiples of the spacing of the exposures to obtain meshing series of exposures on the film.

2. The cinematographic process including, holding a film with a portion curved about a center, dividing a shaft of light from a subject into a plurality of shafts and directing them toward the film radially relative to the curvature of said portion of the film to make a plurality of photographic exposures in longitudinal alignment simultaneously on the film equally spaced apart distances substantially equal to their longitudinal extents, filtering said shafts of light so that they are chromatically different, and intermittently advancing the film distances that are approximately multiples of the spacing of the exposures to obtain thereon a plurality of meshing series of photographic exposures.

3. The cinematographic process including, holding a length of film with a portion curved about a center, dividing a single shaft of light from a subject into a plurality of shafts and directing them radially relative to said center to fall on spaced parts of said portion of the film making longitudinally spaced photographic exposures on the film spaced apart distances at least equaling their lengths, and intermittently advancing the film distances that are approximately multiples of the spacing of the exposures to obtain meshing series of exposures thereon.

In witness that I claim the foregoing I have hereunto subscribed my name this 9th day of Ooctober, 1928.

WALTER L. WRIGHT.